(12) United States Patent
Kayano et al.

(10) Patent No.: US 11,855,490 B2
(45) Date of Patent: Dec. 26, 2023

(54) ROTARY ELECTRIC MACHINE

(71) Applicant: Mitsubishi Electric Corporation, Tokyo (JP)

(72) Inventors: Shinsuke Kayano, Tokyo (JP); Tatsuo Nishimura, Tokyo (JP); Junji Kitao, Tokyo (JP); Hitoshi Isoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 144 days.

(21) Appl. No.: 17/572,008

(22) Filed: Jan. 10, 2022

(65) Prior Publication Data

US 2022/0320924 A1 Oct. 6, 2022

(30) Foreign Application Priority Data

Apr. 1, 2021 (JP) ................... 2021-062520

(51) Int. Cl.
*H02K 21/14* (2006.01)
*H02K 1/27* (2022.01)
*H02K 1/276* (2022.01)
*H02K 29/03* (2006.01)

(52) U.S. Cl.
CPC ........... *H02K 1/2766* (2013.01); *H02K 21/14* (2013.01); *H02K 29/03* (2013.01); *H02K 2213/03* (2013.01)

(58) Field of Classification Search
CPC .. H02K 1/2766; H02K 21/14; H02K 2213/03; H02K 29/03
USPC ..................................... 310/156.56
See application file for complete search history.

(56) References Cited

U.S. PATENT DOCUMENTS

| | | | | |
|---|---|---|---|---|
| 9,231,445 B2* | 1/2016 | Sano | ..................... | H02K 1/2766 |
| 10,122,231 B2* | 11/2018 | Kifuji | ................... | H02K 1/2766 |
| 10,530,205 B2* | 1/2020 | Hattori | ................. | H02K 1/2766 |
| 10,686,341 B2* | 6/2020 | Sano | ........................ | H02K 3/12 |
| 2002/0047436 A1* | 4/2002 | Sakai | ..................... | H02K 21/46 |
| | | | | 310/156.56 |
| 2018/0145552 A1* | 5/2018 | Hattori | ................. | H02K 1/2766 |
| 2019/0089216 A1* | 3/2019 | Sano | ..................... | H02K 7/006 |

FOREIGN PATENT DOCUMENTS

| | | | |
|---|---|---|---|
| JP | 2007-274798 A | | 10/2007 |
| JP | 2011-223836 A | | 11/2011 |
| JP | 2018082540 A | * | 5/2018 |

(Continued)

*Primary Examiner* — Alex W Mok
(74) *Attorney, Agent, or Firm* — Sughrue Mion, PLLC; Richard C. Turner

(57) ABSTRACT

In a rotor in which magnet slots arranged in a V shape so as to open toward the outer circumferential side and having permanent magnets inserted therein are formed in a two-layer structure in a radial direction, the magnet slots in each layer are composed of a pair of slots formed between a center bridge located at the center and respective ones of two radially-outer bridges located between the outer surface of the rotor and the respective slots. Of magnetic fluxes generated from the permanent magnets, magnetic fluxes excluding magnetic fluxes for magnetically saturating the bridges are defined as effective magnetic fluxes. The rotor is configured such that the effective magnetic flux generated from the permanent magnet on the radially outer side is not greater than half the effective magnetic flux generated from the permanent magnet on the radially inner side.

19 Claims, 16 Drawing Sheets

(56) References Cited

FOREIGN PATENT DOCUMENTS

| JP | 2020129853 A | * | 8/2020 |
| JP | 2020137139 A | * | 8/2020 |
| WO | WO-2019174323 A1 | * | 9/2019 |
| WO | WO-2020027338 A1 | * | 2/2020 |

* cited by examiner

ROTARY ELECTRIC MACHINE

BACKGROUND OF THE INVENTION

1. Field of the Invention

The present disclosure relates to a rotary electric machine.

2. Description of the Background Art

As a rotary electric machine having high torque, an interior-permanent-magnet synchronous rotary electric machine having permanent magnets embedded in a rotor core is generally known. In the interior-permanent-magnet synchronous rotary electric machine, torque is improved by a magnetic flux generated from an armature winding of a stator, magnet torque due to attraction and repulsion of a magnetic flux generated from permanent magnets of a rotor, and reluctance torque due to magnetic saliency of the rotor. In embedding permanent magnets in the rotor, the magnets may be arranged in multiple layers so that reluctance torque, as well as magnet torque, is increased, thereby improving torque.

Patent Document 1 discloses a configuration of arranging permanent magnets in two layers in a rotor core so as to increase reluctance torque. Patent Document 2 discloses a configuration in which, among permanent magnets arranged in a two-layer structure in a rotor core, a magnet located on the inner side of a magnetic pole has a smaller width and a greater thickness than a magnet located on the outer side of the magnetic pole.

Patent Document 1: Japanese Laid-Open Patent Publication No. 2011-223836
Patent Document 2: Japanese Laid-Open Patent Publication No. 2007-274798

In the rotary electric machines disclosed in Patent Document 1 and Patent Document 2, the amount of leakage magnetic flux at a bridge between magnetic poles is not taken into consideration. Therefore, a gap magnetic flux density generated by a rotor magnetomotive force of the permanent magnets arranged in two layers contains many harmonic components, so that torque pulsation increases, thus causing a problem of increasing vibration and noise.

SUMMARY OF THE INVENTION

The present disclosure has been made to solve the above problem and an object of the present disclosure is to reduce vibration and noise by suppressing torque pulsation.

A rotary electric machine according to the present disclosure includes: a stator formed in a cylindrical shape, the stator having a plurality of teeth on an inner surface side thereof and having a coil wound through coil slots formed between the teeth adjacent to each other; and a rotor formed in a columnar shape, an outer surface thereof being opposed to an inner surface of the stator with a gap therebetween, the rotor being rotatably provided around a rotation center axis. The rotor has magnet slots arranged in a V shape so as to open from the rotation center axis side toward an outer circumferential side such that the magnet slots are formed in a two-layer structure in a radial direction. The magnet slots in each layer are composed of a pair of slots formed between a center bridge located at a center and respective ones of two radially-outer bridges located between the outer surface of the rotor and the respective slots, and a permanent magnet is inserted in each of the slots. Here, in a first-layer permanent magnet which is the permanent magnet inserted in each of first-layer magnet slots which are the magnet slots on a radially outer side, a magnet width excluding a magnet width for magnetically saturating a first-layer center bridge which is the center bridge corresponding to the first-layer magnet slot and a magnet width for magnetically saturating a first-layer radially-outer bridge which is the radially-outer bridge corresponding to the first-layer magnet slot is defined as a first-layer effective magnet width, and a magnetic flux generated from the first-layer effective magnet width is defined as a first-layer effective magnetic flux. In addition, in a second-layer permanent magnet which is the permanent magnet inserted in each of second-layer magnet slots which are the magnet slots on a radially inner side, a magnet width excluding a magnet width for magnetically saturating a second-layer center bridge which is the center bridge corresponding to the second-layer magnet slot and a magnet width for magnetically saturating a second-layer radially-outer bridge which is the radially-outer bridge corresponding to the second-layer magnet slot is defined as a second-layer effective magnet width, and a magnetic flux generated from the second-layer effective magnet width is defined as a second-layer effective magnetic flux. The first-layer effective magnetic flux is not greater than half the second-layer effective magnetic flux.

In the rotary electric machine according to the present disclosure, harmonic components of a rotor magnetomotive force are reduced and torque pulsation is suppressed, thus enabling reduction in vibration and noise caused by the rotary electric machine.

DETAILED DESCRIPTION OF THE PREFERRED EMBODIMENTS OF THE INVENTION

First Embodiment

Figure 1:
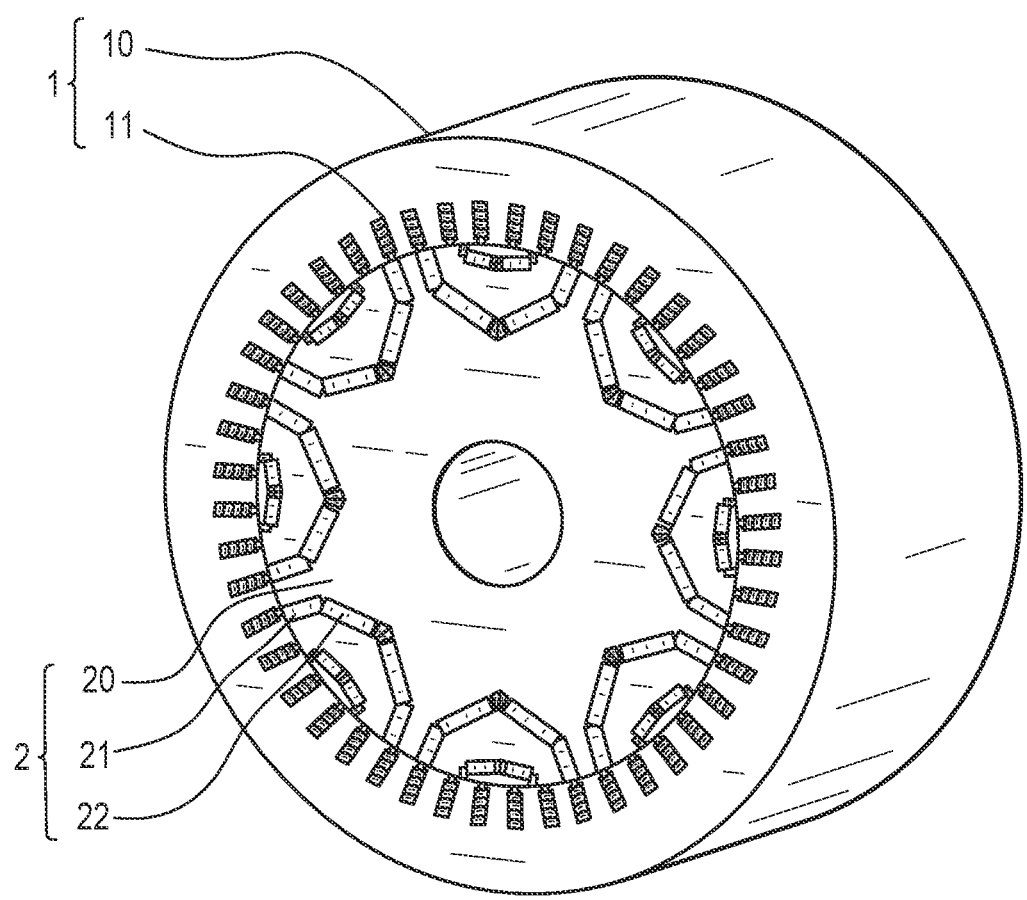
FIG. 1 is an external view showing the schematic structure of a rotary electric machine according to the first embodiment of the present disclosure.
Figure 2:
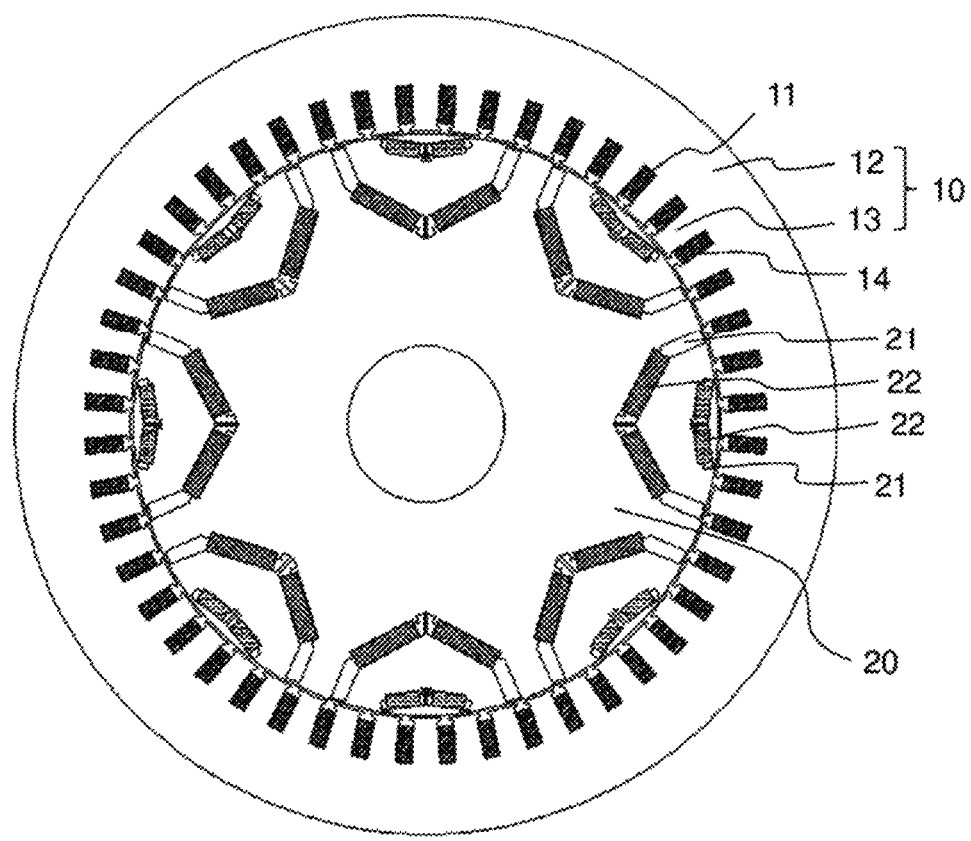
FIG. 2 is a sectional view along a direction perpendicular to a rotation center axis, showing the schematic structure of the rotary electric machine according to the first embodiment.

FIG. 1 is an external view showing the schematic structure of a rotary electric machine according to the first embodiment of the present disclosure. FIG. 2 is a sectional view along a direction perpendicular to a rotation center axis, showing the schematic structure of the rotary electric machine according to the first embodiment. As shown in FIG. 1, the rotary electric machine includes a stator 1 and a rotor 2. The stator 1 formed in a cylindrical shape is composed of a stator core 10 stacked in the rotation axis direction and a coil 11. The rotor 2 is formed in a columnar shape having an outer surface opposed to the inner surface of the stator 1 with a gap therebetween, and is rotatably provided around the rotation center axis. The rotor 2 is composed of a rotor core 20 stacked in the rotation axis direction and permanent magnets 22 inserted in magnet slots 21. As shown in FIG. 2, the stator core 10 is formed by an annular core back 12 and teeth 13 protruding in a projection shape toward the inner surface side. The coil 11 is wound through coil slots 14 between the teeth. The rotor 2 has, for each single pole, the magnet slots 21 arranged in two layers in the radial direction such that the magnet slots 21 in each layer are arranged in a V shape so as to open from the rotation center axis side toward the outer circumferential side, and the permanent magnets 22 are inserted in the magnet slots 21 in two layers.

Figure 3:
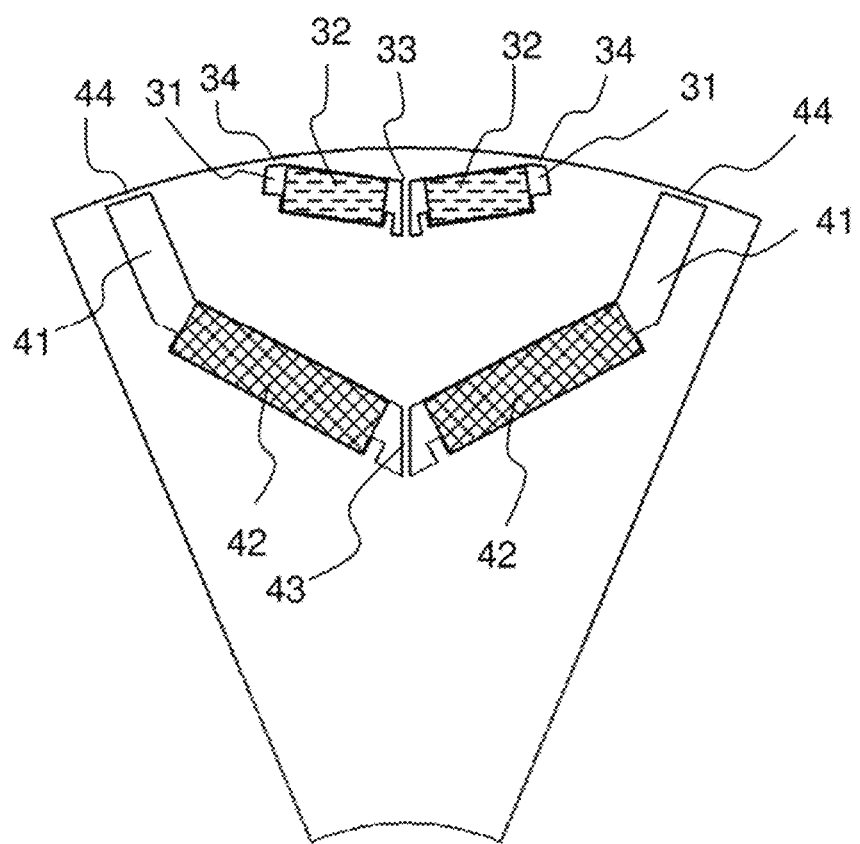
FIG. 3 is an enlarged sectional view showing the structure of a rotor for one pole of the rotary electric machine according to the first embodiment.

FIG. 3 is an enlarged sectional view along a direction perpendicular to the rotation center axis, showing the structure of the rotor for one pole of the rotary electric machine according to the first embodiment. It is noted that the drawings showing structures subsequent to FIG. 3 are also sectional views along a direction perpendicular to the rotation center axis. The rotor is composed of a rotor core having two layers of magnet slots arranged in a V shape, and permanent magnets inserted in the magnet slots in two layers. The magnet slots in two layers are composed of first-layer magnet slots 31 on the radially outer side of the rotor and second-layer magnet slots 41 on the radially inner side of the rotor. The magnet slots in each layer are composed of a pair of slots formed between a center bridge located at the center and respective ones of two radially-outer bridges located between the outer surface of the rotor 2 and the respective slots, and a permanent magnet is inserted in each of the slots. That is, the first-layer magnet slots 31 are composed of a pair of slots formed between a first-layer center bridge 33 located at the center and two first-layer radially-outer bridges 34 located between the outer surface of the rotor and the respective slots. The second-layer magnet slots 41 are composed of a pair of slots formed between a second-layer center bridge 43 located at the center and two second-layer radially-outer bridges 44 located between the outer surface of the rotor and the respective slots. First-layer permanent magnets 32 are inserted in the first-layer magnet slots 31 and second-layer permanent magnets 42 are inserted in the second-layer magnet slots 41.

Figure 4:
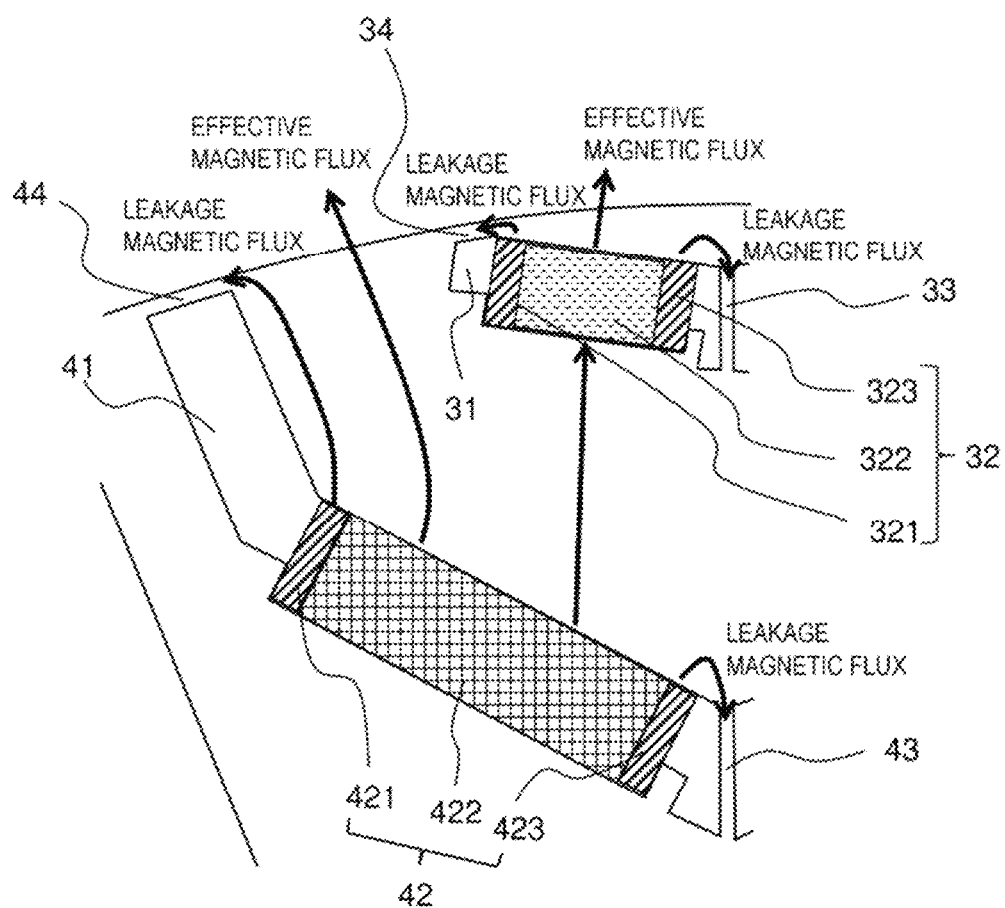
FIG. 4 is an enlarged schematic view showing states of magnetic fluxes generated from permanent magnets in the rotor of the rotary electric machine according to the first embodiment.

FIG. 4 is an enlarged schematic view showing the states of magnetic fluxes generated from the permanent magnets, and the shown magnet magnetic fluxes are classified into effective magnetic fluxes and leakage magnetic fluxes. Although the magnet slots in each of the first and second layers are composed of a pair of slots arranged in a V shape as described above, FIG. 4 shows only the slot part on one side of the pair of slots in both of the first-layer magnet slot and the second-layer magnet slot. The first-layer permanent magnet 32 on the radially outer side of the rotor has three areas of a first-layer radially-outer-bridge-side magnet 321, a first-layer effective magnet 322, and a first-layer center-bridge-side magnet 323, which are classified by the generated magnetic fluxes. The magnetic flux generated from the first-layer radially-outer-bridge-side magnet 321 extends around to the first-layer radially-outer bridge 34, so as to be used for magnetically saturating the first-layer radially-outer bridge 34. Therefore, the magnetic flux generated from the first-layer radially-outer-bridge-side magnet 321 becomes a leakage magnetic flux that does not contribute to a gap magnetic flux between the stator and the rotor. The magnetic flux generated from the first-layer center-bridge-side magnet 323 extends around to the first-layer center bridge 33, so as to be used for magnetically saturating the first-layer center bridge 33. Therefore, the magnetic flux generated from the first-layer center-bridge-side magnet 323 becomes a leakage magnetic flux that does not contribute to the gap magnetic flux between the stator and the rotor. The magnetic flux generated from the first-layer effective magnet 322 extends toward the gap between the stator 1 and the rotor 2 and thus becomes an effective magnetic flux that contributes to the gap magnetic flux between the stator 1 and the rotor 2.

The second-layer permanent magnet 42 on the radially inner side of the rotor has three areas of a second-layer radially-outer-bridge-side magnet 421, a second-layer effective magnet 422, and a second-layer center-bridge-side magnet 423, which are classified by the generated magnetic fluxes. The magnetic flux generated from the second-layer radially-outer-bridge-side magnet 421 extends around to the second-layer radially-outer bridge 44, so as to be used for magnetically saturating the second-layer radially-outer bridge 44. Therefore, the magnetic flux generated from the second-layer radially-outer-bridge-side magnet 421 becomes a leakage magnetic flux that does not contribute to the gap magnetic flux between the stator and the rotor. The magnetic flux generated from the second-layer center-bridge-side magnet 423 extends around to the second-layer center bridge 43, so as to be used for magnetically saturating the second-layer center bridge 43. Therefore, the magnetic flux generated from the second-layer center-bridge-side magnet 423 becomes a leakage magnetic flux that does not contribute to the gap magnetic flux between the stator 1 and the rotor 2. The magnetic flux generated from the second-layer effective magnet 422 is divided into a magnetic flux extending toward the first-layer effective magnet 322 and a magnetic flux passing between the first-layer magnet slot 31 and the second-layer magnet slot 41 and extending toward the gap between the stator 1 and the rotor 2. At this time, the magnetic flux generated from the second-layer effective magnet 422 is divided into the magnetic flux extending toward the first-layer effective magnet 322 and the magnetic flux passing between the first-layer magnet slot 31 and the second-layer magnet slot 41 and extending toward the gap between the stator 1 and the rotor 2, in accordance with the ratio of the width of the first-layer effective magnet 322 and the width of the second-layer effective magnet 422.

Figure 5:
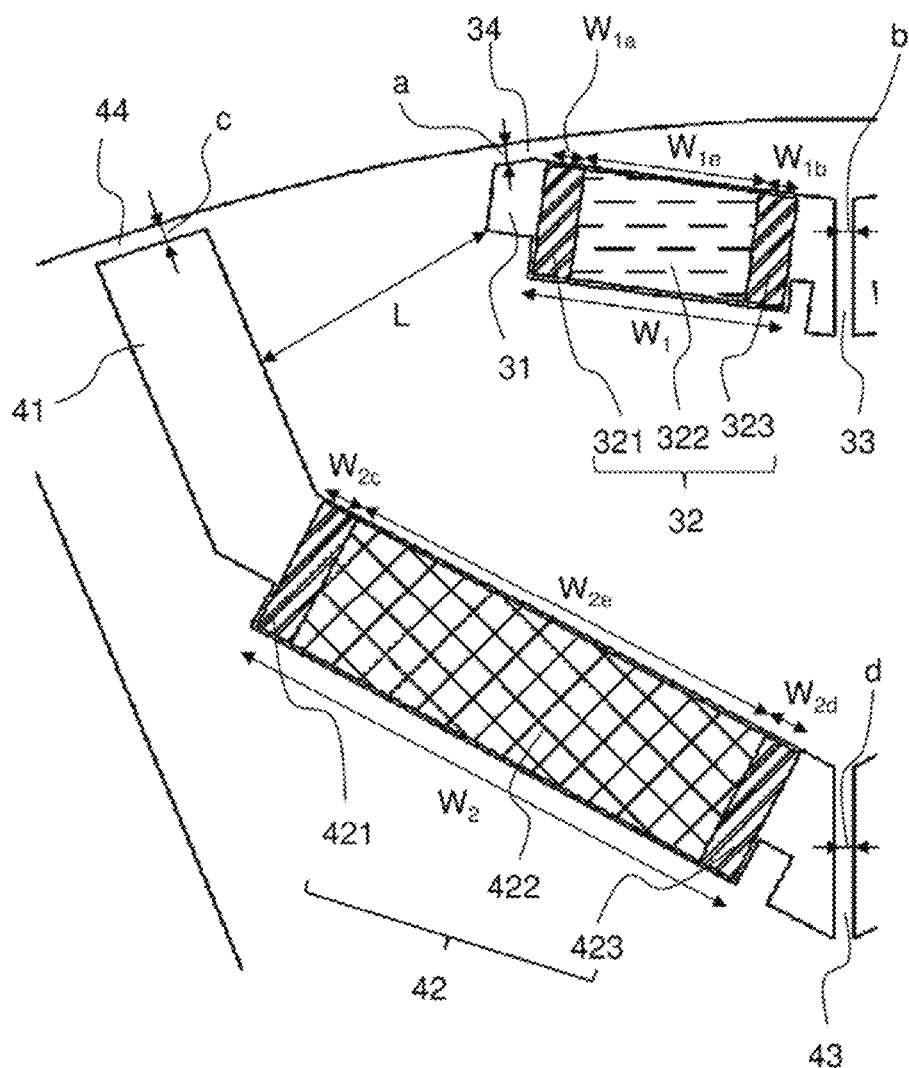
FIG. 5 is an enlarged schematic view showing the details of the dimensions of magnet slots and the permanent magnets in the rotor of the rotary electric machine according to the first embodiment.

FIG. 5 is an enlarged schematic view showing the details of the dimensions of the magnet slots and the permanent magnets. The width of the first-layer radially-outer bridge 34 on the radially outer side of the rotor is denoted by a, and the width of the first-layer center bridge 33 is denoted by b. The width of the second-layer radially-outer bridge 44 on the radially inner side of the rotor is denoted by c, and the width of the second-layer center bridge 43 is denoted by d. Regarding the width of each bridge, if the width is not uniform, the width at a part where the bridge width is narrowest is defined as the width of the bridge. The width of the first-layer permanent magnet 32 on the radially outer side of the rotor is denoted by $W_1$, and the width of the second-layer permanent magnet 42 on the radially inner side of the rotor is denoted by $W_2$. The width of the first-layer radially-outer-bridge-side magnet 321 used for magnetically saturating the first-layer radially-outer bridge is denoted by $W_{1a}$, and the width of the first-layer center-bridge-side magnet 323 used for magnetically saturating the first-layer center bridge is denoted by $W_{1b}$. The width of the second-layer radially-outer-bridge-side magnet 421 used for magnetically saturating the second-layer radially-outer bridge is denoted by $W_{2c}$, and the width of the second-layer center-bridge-side magnet 423 used for magnetically saturating the second-layer center bridge is denoted by $W_{2d}$. Here, the width of each magnet is the dimension in the direction from the radially-outer-bridge-side end to the center-bridge-side end of the permanent magnet, as shown in FIG. 5. Where the saturation magnetic flux density of the rotor core is denoted by $B_s$, the first-layer magnet magnetic flux density is denoted by $B_{m1}$, and the second-layer magnet magnetic flux density is denoted by $B_{m2}$, the width $W_{1a}$ of the first-layer radially-outer-bridge-side magnet 321, the width $W_{1b}$ of the first-layer center-bridge-side magnet 323, the width $W_{2c}$ of the second-layer radially-outer-bridge-side magnet 421, and the width $W_{2d}$ of the second-layer center-bridge-side magnet 423 are calculated by Expressions (1) to (4). It is noted that each of the widths of the magnets shown above is the width of the permanent magnet inserted in one of the pair of slots in both of the first and second layers.

$$W_{1a} = a \times \frac{B_s}{B_{m1}} \tag{1}$$

$$W_{1b} = \frac{b}{2} \times \frac{B_s}{B_{m1}} \tag{2}$$

$$W_{2c} = c \times \frac{B_s}{B_{m2}} \tag{3}$$

$$W_{2d} = \frac{d}{2} \times \frac{B_s}{B_{m2}} \tag{4}$$

Not only the leakage magnetic flux from the first-layer permanent magnet 32 shown in FIG. 5, but also the leakage magnetic flux from the permanent magnet located on the side opposite to the first-layer permanent magnet 32 shown in FIG. 5 across the first-layer center bridge 33, extend around to the first-layer center bridge 33. Therefore, the first-layer center-bridge-side magnet 323 is used for magnetically saturating the first-layer center bridge 33 for half the width thereof. Similarly, the leakage magnetic flux from the permanent magnet located on the side opposite to the second-layer permanent magnet 42 shown in FIG. 5 across the second-layer center bridge 43 also extends around to the second-layer center bridge 43. Therefore, the second-layer center-bridge-side magnet 423 is used for magnetically saturating the second-layer center bridge 43 for half the width thereof. In a case where the saturation magnetic flux density $B_s$ in the rotor core formed from stacked electromagnetic steel sheets is 2 T and the first-layer magnet magnetic flux density $B_{m1}$ and the second-layer magnet magnetic flux density $B_{m2}$ are 1 T, the width $W_{1a}$ of the first-layer radially-outer-bridge-side magnet 321, the width $W_{1b}$ of the first-layer center-bridge-side magnet 323, the width $W_{2c}$ of the second-layer radially-outer-bridge-side magnet 421, and the width $W_{2d}$ of the second-layer center-bridge-side magnet 423 are calculated by Expressions (5) to (8).

$$W_{1a} = a \times \frac{2}{1} = 2a \tag{5}$$

$$W_{1b} = \frac{b}{2} \times \frac{2}{1} = b \tag{6}$$

$$W_{2c} = c \times \frac{2}{1} = 2c \tag{7}$$

$$W_{2d} = \frac{d}{2} \times \frac{2}{1} = d \tag{8}$$

Where the width of the first-layer effective magnet 322 is denoted by $W_{1e}$ and the width of the second-layer effective magnet 422 is denoted by $W_{2e}$, the width $W_{1e}$ of the first-layer effective magnet 322 is a value obtained by subtracting the width $W_{1a}$ of the first-layer radially-outer-bridge-side magnet 321 and the width $W_{1b}$ of the first-layer center-bridge-side magnet 323 from the width $W_1$ of the first-layer magnet, and the width $W_{2e}$ of the second-layer effective magnet 422 is a value obtained by subtracting the width $W_{2c}$ of the second-layer radially-outer-bridge-side magnet 421 and the width $W_{2d}$ of the second-layer center-bridge-side magnet 423 from the width $W_2$ of the second-layer magnet. Therefore, the width $W_{1e}$ of the first-layer effective magnet 322 and the width $W_{2e}$ of the second-layer effective magnet 422 are calculated by Expressions (9) and (10), using Expressions (1) to (4).

$$W_{1e} = W_1 - W_{1a} - W_{1b} = W_1 - a \times \frac{B_s}{B_{m1}} - \frac{b}{2} \times \frac{B_s}{B_{m1}} \tag{9}$$

$$W_{2e} = W_2 - W_{2c} - W_{2d} = W_2 - c \times \frac{B_s}{B_{m2}} - \frac{d}{2} \times \frac{B_s}{B_{m2}} \tag{10}$$

The width $W_{1e}$ of the first-layer effective magnet 322 calculated by Expression (9) and the width $W_{2e}$ of the second-layer effective magnet 422 calculated by Expression (10) are magnet widths that contribute to a rotor magnetomotive force. A value obtained by multiplying the width $W_{1e}$ of the first-layer effective magnet 322 calculated by Expression (9) by the first-layer magnet magnetic flux density $B_{m1}$ is a first-layer effective magnetic flux $\varphi_{m1}$, and a value obtained by multiplying the width $W_{2e}$ of the second-layer effective magnet 422 calculated by Expression (10) by the second-layer magnet magnetic flux density $B_{m2}$ is a second-layer effective magnetic flux $\varphi_{m2}$. In Expressions (5) to (10), the saturation magnetic flux density $B_s$ in the rotor core formed from stacked electromagnetic steel sheets is defined as 2 T and the first-layer magnet magnetic flux density $B_{m1}$ and the second-layer magnet magnetic flux density $B_{m2}$ are defined as 1 T. The saturation magnetic flux density $B_s$ of the rotor core is 1.5 T to 2.0 T in electromagnetic steel sheets generally used, and in a case of using a neodymium magnet, the magnet magnetic flux density $B_m$ is generally in a range of 1.0 T to 1.4 T. The first-layer magnet and the second-layer magnet may be the same magnets or different magnets.

As shown in FIG. 5, the shortest distance between the first-layer magnet slot 31 and the second-layer magnet slot 41 is denoted by L. Between the first-layer magnet slot 31 and the second-layer magnet slot 41, at maximum, a magnetic flux based on half the width Wee of the second-layer effective magnet 422 and a magnetic flux based on the width $W_{2c}$ of the second-layer radially-outer-bridge-side magnet 421, pass. Where the saturation magnetic flux density of the rotor core 20 is denoted by $B_s$ and the magnetic flux density of the second-layer magnet is denoted by $B_{m2}$, a relational expression of Expression (11) needs to be satisfied in order not to cause magnetic saturation between the first-layer magnet slot 31 and the second-layer magnet slot 41.

$$\frac{W_{2e}}{2} + W_{2c} < L \times \frac{B_s}{B_{m2}} \quad (11)$$

The left-hand side of Expression (11) is calculated as Expression (12) by Expression (10).

$$\frac{W_{2e}}{2} + W_{2c} = \frac{W_2}{2} + \frac{W_{2c}}{2} - \frac{W_{2d}}{2} = \frac{W_2}{2} + \frac{c}{2} \times \frac{B_s}{B_{m2}} - \frac{d}{4} \times \frac{B_s}{B_{m2}} \quad (12)$$

Thus, the relational expression of Expression (11) is represented by Expression (13).

$$\frac{W_2}{2} + \frac{c}{2} \times \frac{B_s}{B_{m2}} - \frac{d}{4} \times \frac{B_s}{B_{m2}} < L \times \frac{B_s}{B_{m2}} \quad (13)$$

If magnetic saturation occurs between the first-layer magnet slot 31 and the second-layer magnet slot 41, the gap magnetic flux density is also reduced, so that torque is reduced. In addition, since the part where the effective magnetic flux passes is magnetically saturated, harmonic components of the gap magnetic flux density are increased, resulting in increase of vibration and noise. Preventing magnetic saturation between the first-layer magnet slot 31 and the second-layer magnet slot 41 can suppress reduction in the gap magnetic flux density, whereby reduction in torque can be suppressed. In addition, preventing magnetic saturation at the part where the effective magnetic flux passes can reduce harmonic components of the gap magnetic flux density, whereby vibration and noise can be reduced.

Figure 6:
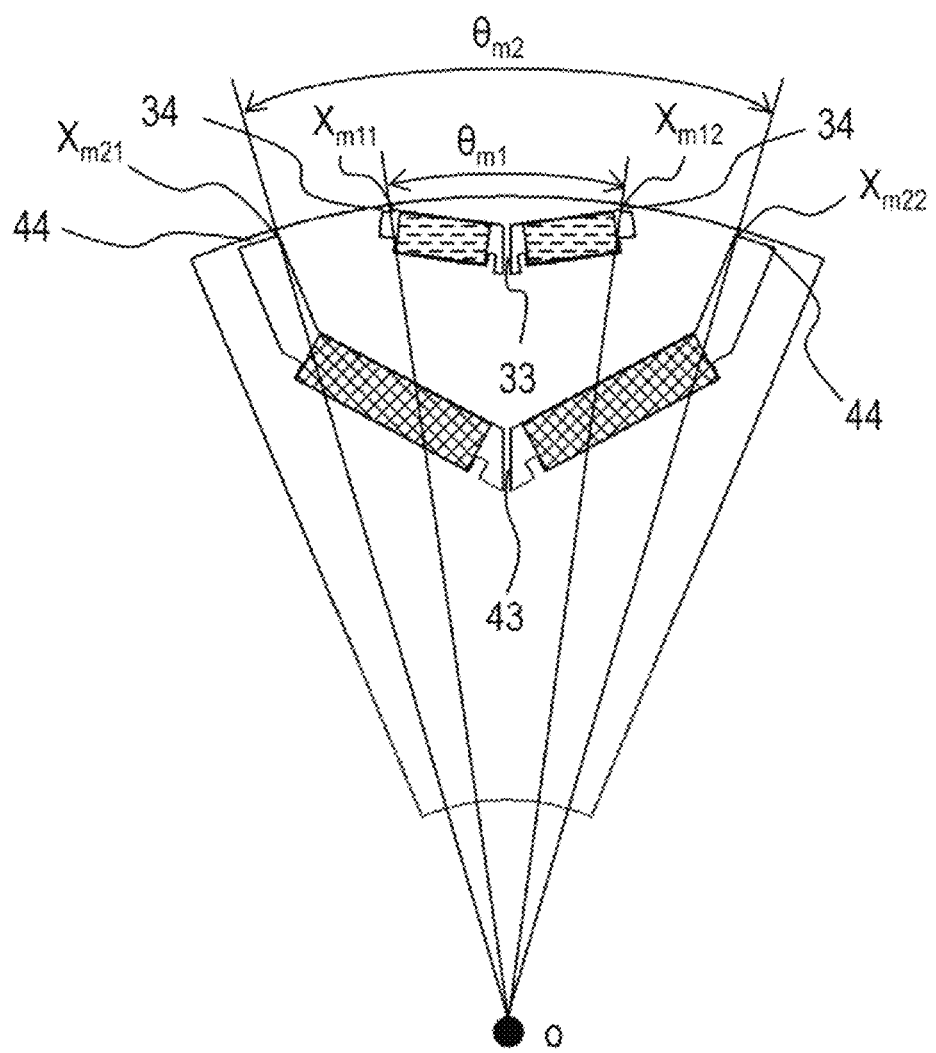
FIG. 6 is a sectional view illustrating magnet pole arc angles in the rotor of the rotary electric machine according to the first embodiment.
Figure 7:
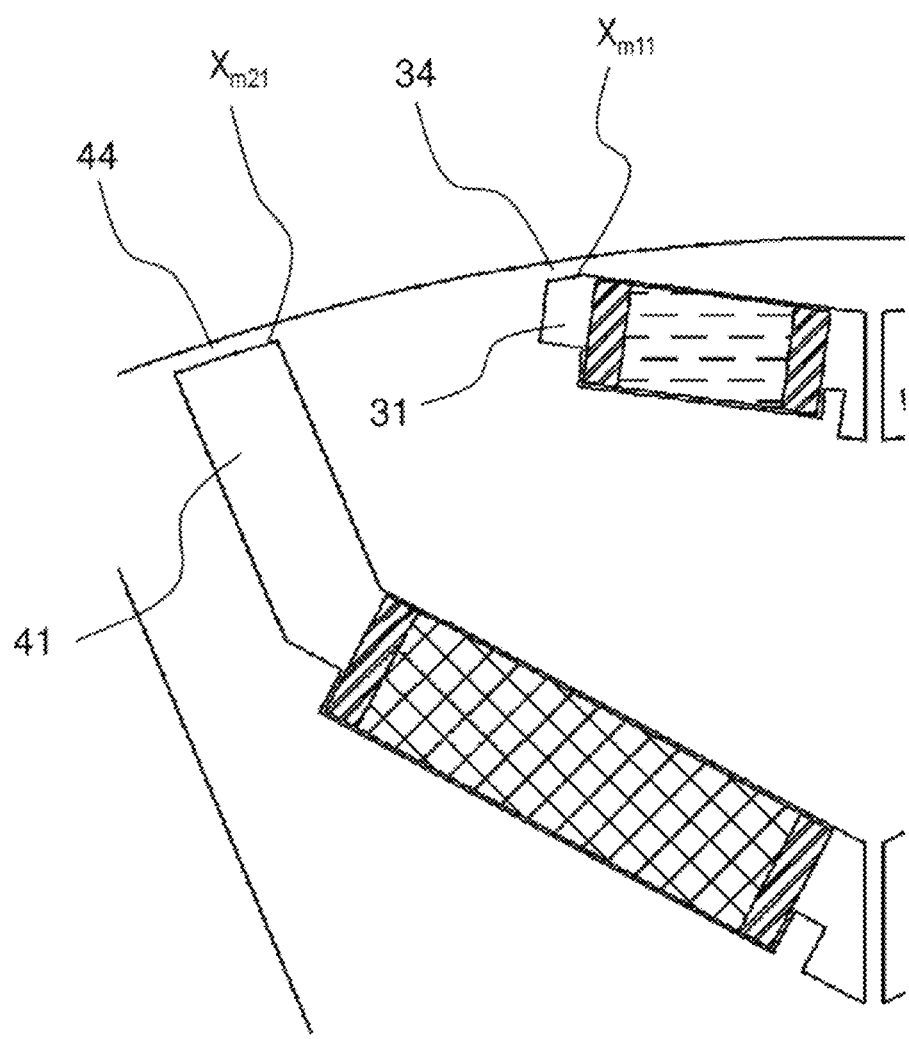
FIG. 7 is an enlarged sectional view illustrating magnet pole arc angles in the rotor of the rotary electric machine according to the first embodiment, as a support for FIG. 6.

FIG. 6 is a sectional view showing the dimensions of magnet pole arc angles in the first and second layers. The rotation center axis of the rotor is denoted by O. On sides of the first-layer magnet slots 31 that are in contact with the radially-outer bridges 34, points at the V-shape-inner-side corners are denoted by $X_{m11}$ and $X_{m12}$, respectively. A first-layer magnet pole arc angle $\theta_{m1}$ is defined as an angle between a line connecting the rotation center axis O and $X_{m11}$ and a line connecting the rotation center axis O and $X_{m12}$. On sides of the second-layer magnet slots 41 that are in contact with the radially-outer bridges 44, points at the V-shape-inner-side corners are denoted by $X_{m21}$ and $X_{m22}$, respectively. A second-layer magnet pole arc angle $\theta_{m2}$ is defined as an angle between a line connecting the rotation center axis O and $X_{m21}$ and a line connecting the rotation center axis O and $X_{m22}$. $X_{m11}$ and $X_{m21}$ in FIG. 6 are clearly shown in an enlarged sectional view in FIG. 7. The first-layer magnet pole arc angle $\theta_{m1}$ is a range of the magnetomotive force generated by the first-layer effective magnet width and half the second-layer effective magnet width, and a range obtained by excluding the first-layer magnet pole arc angle $\theta_{m1}$ from the second-layer magnet pole arc angle $\theta_{m2}$ is a range of the magnetomotive force generated by half the second-layer effective magnet width. A magnet pole arc angle in electric angle is calculated as a value obtained by multiplying a magnet pole arc angle in mechanical angle by the number of pole pairs.

Figure 8:
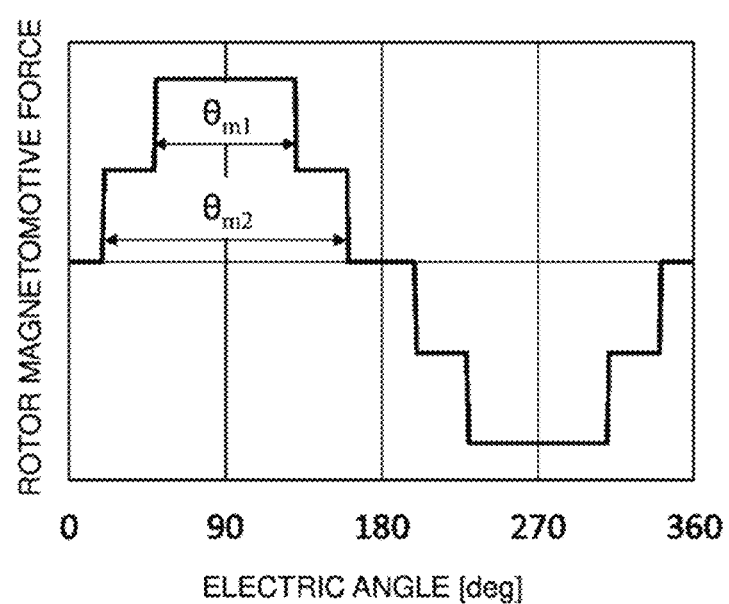
FIG. 8 schematically illustrates a rotor magnetomotive force based on an effective magnetic flux of the rotor of the rotary electric machine according to the first embodiment.

FIG. 8 schematically shows the rotor magnetomotive force based on the effective magnetic flux in the effective magnet width. In the range of the first-layer magnet pole arc angle $\theta_{m1}$, the rotor magnetomotive force has a magnitude of the magnetomotive force generated by the first-layer effective magnetic flux and half the second-layer effective magnetic flux, and in the range obtained by excluding the first-layer magnet pole arc angle $\theta_{m1}$ from the second-layer magnet pole arc angle $\theta_{m2}$, the rotor magnetomotive force has a magnitude of the magnetomotive force generated by half the second-layer effective magnetic flux. The gap magnetic flux density is calculated as a value obtained by multiplying the rotor magnetomotive force by permeance between the rotor and the stator. Therefore, in order to reduce harmonic components of the gap magnetic flux density, it is effective to reduce harmonic components of the rotor magnetomotive force. Where Fi denotes the magnitude of a fundamental component in one cycle of electric angle of the rotor magnetomotive force and $F_n$ denotes the magnitude of an nth-order component of the rotor magnetomotive force, a harmonic content ratio THD as an index indicating the content ratio of harmonic components in the rotor magnetomotive force is defined by Expression (14).

$$THD = \frac{\sqrt{\sum_{n=2}^{\infty} F_n^2}}{F_1} \quad (14)$$

As THD decreases, the waveform of the rotor magnetomotive force becomes closer to a sine wave, and therefore the waveform of the gap magnetic flux density also becomes closer to a sine wave, so that vibration and noise can be reduced.

Figure 9:
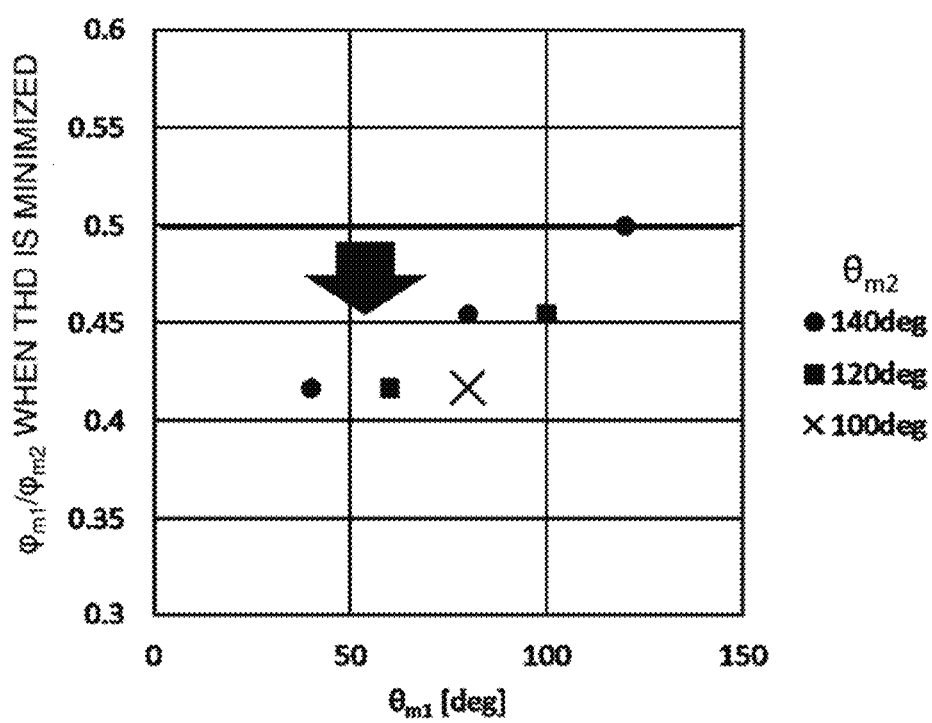
FIG. 9 illustrates an effective magnetic flux when a harmonic content ratio THD of the rotor magnetomotive force is minimized in the rotary electric machine according to the first embodiment.

FIG. 9 shows the relationship of the effective magnetic fluxes when THD of the rotor magnetomotive force is minimized. Each of the first-layer magnet pole arc angle $\theta_{m1}$ and the second-layer magnet pole arc angle $\theta_{m2}$ is a value in electric angle. As the second-layer magnet pole arc angle $\theta_{m2}$, three values of 140 deg, 120 deg, and 100 deg are plotted, and $\varphi_{m1}/\varphi_{m2}$ when THD of the rotor magnetomotive force is minimized is shown while the first-layer magnet pole arc angle $\theta_{m1}$ is changed, for each value of the second-layer magnet pole arc angle $\theta_{m2}$. In this structure, since the second-layer magnet slots are provided, the maximum value of the second-layer magnet pole arc angle $\theta_{m2}$ is set at 140 deg. In each condition of the first-layer magnet pole arc angle $f_{m1}$ and the second-layer magnet pole arc angle $\theta_{m2}$, THD of the rotor magnetomotive force is minimized when $\varphi_{m1}/\varphi_{m2}$ obtained by dividing the first-layer effective magnetic flux $\varphi_{m1}$ by the second-layer effective magnetic flux $\varphi_{m2}$ is not greater than 0.5. That is, if the structure is designed such that the first-layer effective magnetic flux $\varphi_{m1}$ is not greater than half the second-layer effective magnetic flux $\varphi_{m2}$, THD of the rotor magnetomotive force can be minimized. In addition, an extra magnet width that leads to increase in harmonic components can be reduced, and thus the amount of magnets can also be reduced.

Half the magnetic flux of the second-layer effective magnet 422 extends toward the first-layer effective magnet 322, and the other half of the magnetic flux passes between the first-layer magnet slot and the second-layer magnet slot and extends toward the gap. Therefore, if the first-layer effective magnetic flux generated from the first-layer effective magnet 322 is greater than half the second-layer effective magnetic flux generated from the second-layer effective magnet 422, the magnetomotive force in the range of the first-layer magnet pole arc angle $\theta_{m1}$ of the rotor magnetomotive force increases, so that harmonic components are increased. Accordingly, as shown in FIG. 9, if the first-layer effective magnetic flux $\varphi_{m1}$ is set to be not greater than half the second-layer effective magnetic flux $\varphi_{m2}$, i.e., $\varphi_{m1} \leq \varphi_{m2}/2$ is satisfied, THD of the rotor magnetomotive force can be minimized, whereby vibration and noise can be reduced.

As described above, the first-layer effective magnetic flux $\varphi_{m1}$ is a value obtained by multiplying the width $W_{1e}$ of the first-layer effective magnet 322 calculated by Expression (9) by the first-layer magnet magnetic flux density $B_{m1}$, and the second-layer effective magnetic flux $\varphi_{m2}$ is a value obtained by multiplying the width Wee of the second-layer effective magnet 422 calculated by Expression (10) by the second-layer magnet magnetic flux density $B_{m2}$. Therefore, the structure may be designed so as to satisfy the following expression.

$$W_1 - a \times \frac{B_s}{B_{m1}} - \frac{b}{2} \times \frac{B_s}{B_{m1}} \leq \frac{\left(W_2 - c \times \frac{B_s}{B_{m2}} - \frac{d}{2} \times \frac{B_s}{B_{m1}}\right) \times \frac{B_{m2}}{B_{m1}}}{2} \quad (15)$$

Figure 10:
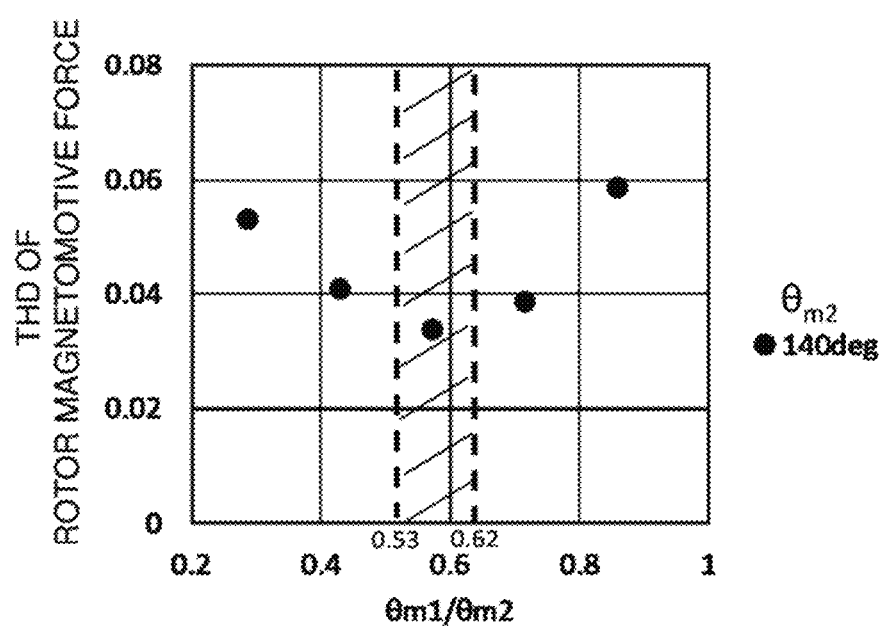
FIG. 10 is a first graph showing the relationship between the magnet pole arc angles and the harmonic content ratio THD of the rotor magnetomotive force in the rotary electric machine according to the first embodiment.
Figure 11:
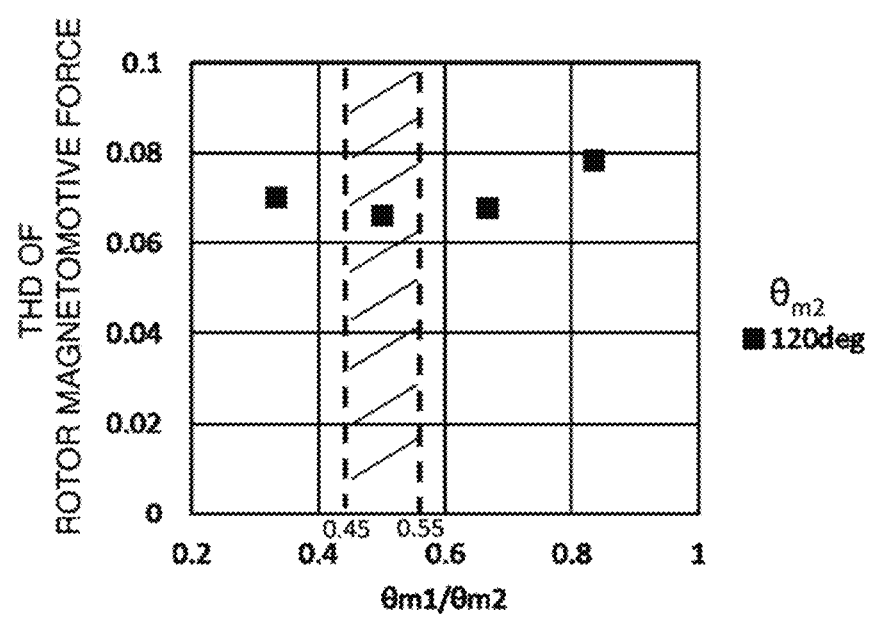
FIG. 11 is a second graph showing the relationship between the magnet pole arc angles and the harmonic content ratio THD of the rotor magnetomotive force in the rotary electric machine according to the first embodiment.

FIG. 10 and FIG. 11 show the relationship between the magnet pole arc angles and THD of the rotor magnetomotive force. As shown in FIG. 10, in the case where the second-layer magnet pole arc angle $\theta_{m2}$ is 140 deg, THD of the rotor magnetomotive force is minimized when the ratio $\theta_{m1}/\theta2$ of the first-layer magnet pole arc angle $\theta_{m1}$ and the second-layer magnet pole arc angle $\theta_{m2}$ is 80/140, i.e., 0.57. The first-layer magnet pole arc angle $\theta_{m1}$ and the second-layer magnet pole arc angle $\theta_{m2}$ have some tolerances in manufacturing and thus vary. In a case where a motor with four pole pairs has a tolerance of ±1 deg in mechanical angle, there is variation of ±4 deg in electric angle. At this time, the ratio $\theta_{m1}/\theta_{m2}$ of the first-layer magnet pole arc angle $\theta_{m1}$ and the second-layer magnet pole arc angle $\theta_{m2}$ falls within a range of 0.53 to 0.62, and therefore, in the case where the second-layer magnet pole arc angle $\theta_{m2}$ is 140 deg, THD of the rotor magnetomotive force is minimized in a range where the ratio $\theta_{m1}/\theta_{m2}$ of the first-layer magnet pole arc angle $\theta_{m1}$ and the second-layer magnet pole arc angle $\theta_{m2}$ is 0.53 to 0.62.

As shown in FIG. 11, in the case where the second-layer magnet pole arc angle $\theta_{m2}$ is 120 deg, THD of the rotor magnetomotive force is minimized when the ratio $\theta_{m1}/\theta_{m2}$ of the first-layer magnet pole arc angle $\theta_{m1}$ and the second-layer magnet pole arc angle $\theta_{m2}$ is 60/120, i.e., 0.50. The first-layer magnet pole arc angle $\theta_{m1}$ and the second-layer magnet pole arc angle $\theta_{m2}$ have some tolerances in manufacturing and thus vary. In a case where a motor with four pole pairs has a tolerance of ±1 deg in mechanical angle, there is variation of ±4 deg in electric angle. At this time, the ratio $\theta_{m1}/\theta_{m2}$ of the first-layer magnet pole arc angle $\theta_{m1}$ and the second-layer magnet pole arc angle $\theta_{m2}$ falls within a range of 0.45 to 0.55, and therefore, in the case where the second-layer magnet pole arc angle $\theta_{m2}$ is 120 deg, THD of the rotor magnetomotive force is minimized in a range where the ratio $\theta_{m1}/\theta_{m2}$ of the first-layer magnet pole arc angle $\theta_{m1}$ and the second-layer magnet pole arc angle $\theta_{m2}$ is 0.45 to 0.55. With reference to FIG. 10 and FIG. 11, it can be said that, in the range where the second-layer magnet pole arc angle $\theta_{m2}$ is 120 deg to 140 deg, THD of the rotor magnetomotive force is almost minimized when $\theta_{m1}/\theta_{m2}$ is not less than 0.45 and not greater than 0.62.

Figure 12:
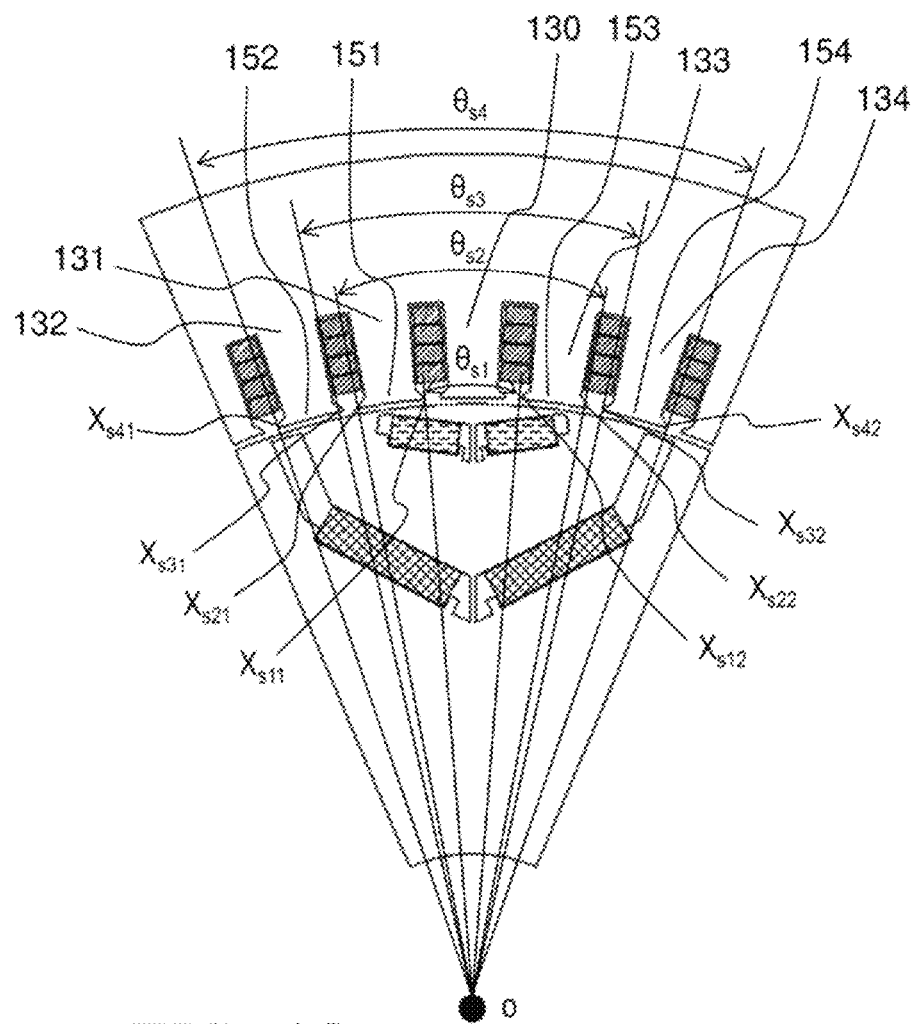
FIG. 12 illustrates the dimensions of arc angles between teeth of a stator of the rotary electric machine according to the first embodiment.

FIG. 12 is a sectional view showing the dimensions of arc angles between teeth in a case where the number of slots per pole per phase is 2 in the stator. The ends of the teeth have protruding brims so that the tooth widths are expanded. The rotation center axis of the rotor is denoted by O. It is assumed that the teeth of the stator are opposed on extension lines of lines connecting the rotation center axis and the respective V-shape-inner-side corners of the sides of the V-shape-arranged first-layer magnet slots that are in contact with the radially-outer bridges. At this time, the teeth of the stator are opposed on extension lines of lines connecting the rotation center axis and the respective V-shape-inner-side corners of the sides of the V-shape-arranged second-layer magnet slots that are in contact with the radially-outer bridges. The effective magnetic fluxes generated from the first-layer magnets and the second-layer magnets are interlinked with the opposed teeth of the stator. Therefore, it is possible to reduce harmonic components of the gap magnetic flux density without obstructing the magnetic fluxes.

Of a brim 151 of a tooth 131 located adjacently counterclockwise from a tooth 130 located on the magnetic pole center axis, a protrusion end located on the tooth 130 side is denoted by $X_{s11}$, and a protrusion end located on the side far from the tooth 130 is denoted by $X_{s21}$. Of a brim 153 of a tooth 133 located adjacently clockwise from the tooth 130 located on the magnetic pole center axis, a protrusion end located on the tooth 130 side is denoted by $X_{s12}$, and a protrusion end located on the side far from the tooth 130 is denoted by $X_{s22}$. An inner arc angle $\theta_{s1}$ of two teeth 131 and 133 across the tooth 130 located on the magnetic pole center axis is defined as an angle between a line connecting the rotation center axis O and $X_{s11}$ and a line connecting the rotation center axis O and $X_{s12}$, and an outer arc angle $\theta_{s2}$ of the two teeth 131 and 133 is defined as an angle between a line connecting the rotation center axis O and $X_{s21}$ and a line connecting the rotation center axis O and $X_{s22}$. Of a brim 152 of a tooth 132 located at the third positions in the circumferential direction counterclockwise from the tooth 130 located on the magnetic pole center axis, a protrusion end located on the tooth 130 side is denoted by $X_{s31}$ and a protrusion end located on the side far from the tooth 130 is denoted by $X_{s41}$. Of a brim 154 of a tooth 134 located at the third position in the circumferential direction clockwise from the tooth 130 located on the magnetic pole center axis, a protrusion end located on the tooth 130 side is denoted by $X_{s32}$ and a protrusion end located on the side far from the tooth 130 is denoted by $X_{s42}$. An inner arc angle $\theta_{s3}$ of two teeth 132 and 134 at the third positions in the circumferential direction from the magnetic pole center axis, i.e., two teeth 132 and 134 across three teeth 130, 131, 133 centered at the tooth 130 located on the magnetic pole center axis, is defined as an angle between a line connecting the rotation center axis O and $X_{s31}$ and a line connecting the rotation center axis O and $X_{s32}$, and an outer arc angle $\theta_{s4}$ of the two teeth 132 and 134 is defined as an angle between a line connecting the rotation center axis O and $X_{s41}$ and a line connecting the rotation center axis O and $X_{s42}$. If the first-layer permanent magnet is at a position opposed to the second tooth 131 in the circumferential direction, the first-layer effective magnetic flux can be interlinked with the stator without being obstructed. That is, the first-layer magnet pole arc angle $\theta_{m1}$ shown in FIG. 6 is set to satisfy $\theta_{s1} \leq \theta_{m1} \leq \theta_{s2}$. In addition, if the second-layer permanent magnet is at a position opposed to the third tooth 132 in the circumferential direction, the second-layer effective magnetic flux can be interlinked with the stator without being obstructed. That is, the second-layer magnet pole arc angle $\theta_{m2}$ shown in FIG. 6 is set to satisfy $\theta_{s3} \leq \theta_{m2} \leq \theta_{s4}$. With this structure, the effective magnetic flux from the first-layer permanent magnet and the effective magnetic flux from the second-layer permanent magnet are interlinked without concentrating on a specific tooth. Thus, harmonic components of the gap magnetic flux density can be reduced, whereby vibration and noise can be reduced. If magnetic fluxes concentrate on a specific tooth, magnetic saturation occurs in the tooth, so that the gap magnetic flux density increases and torque does not increase. In contrast, the above structure relaxes concentration of magnetic fluxes on a specific tooth, thereby enabling increase in torque.

Second Embodiment

Figure 13:
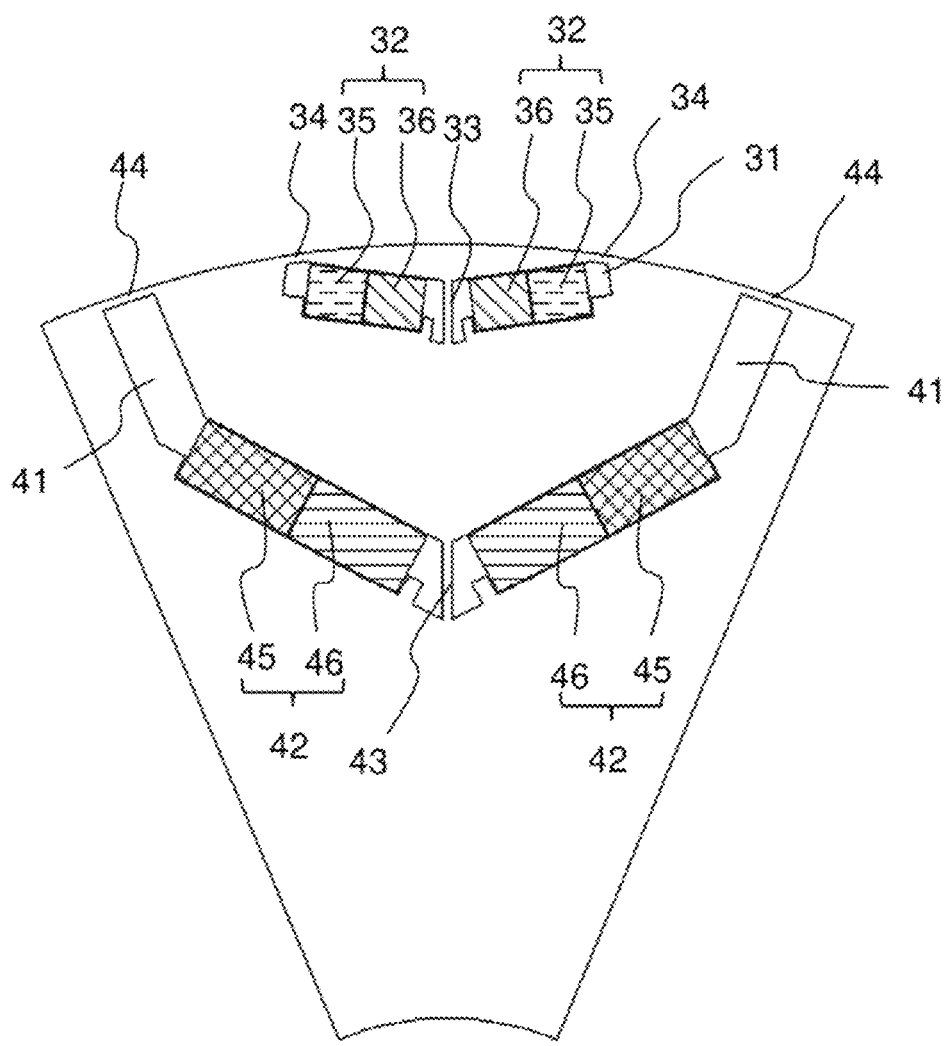
FIG. 13 is an enlarged sectional view showing the structure of a rotor for one pole of a rotary electric machine according to the second embodiment of the present disclosure.

FIG. 13 is an enlarged sectional view showing the structure of a rotor for one pole of a rotary electric machine according to the second embodiment of the present disclosure. As in the first embodiment, the rotor is composed of a rotor core having two layers of magnet slots arranged in a V shape, and permanent magnets inserted in the magnet slots in two layers. The magnet slots in two layers are composed of the first-layer magnet slots 31 on the radially outer side of the rotor and the second-layer magnet slots 41 on the radially inner side of the rotor. The magnet slots in each layer are composed of a pair of slots formed between a center bridge located at the center and respective ones of two radially-outer bridges located between the outer surface of the rotor 2 and the respective slots, and a permanent magnet is inserted in each slot. That is, the first-layer magnet slots 31 are a pair of slots formed between the first-layer center bridge 33 located at the center and the respective first-layer radially-outer bridges 34 located on the radially outer side of the rotor. The second-layer magnet slots 41 are a pair of slots formed between the second-layer center bridge 43 located at the center and the respective second-layer radially-outer bridges 44 located on the radially outer side of the rotor. The first-layer permanent magnets 32 are inserted in the first-layer magnet slots 31, and the second-layer permanent magnets 42 are inserted in the second-layer magnet slots 41. Each first-layer permanent magnet 32 is divided into a first-layer outer magnet 35 on the first-layer radially-outer bridge 34 side and a first-layer center-side magnet 36 on the first-layer center bridge 33 side, and each second-layer permanent magnet 42 is divided into a second-layer outer magnet 45 on the second-layer radially-outer bridge 44 side and a second-layer center-side magnet 46 on the second-layer center bridge 43 side. That is, each of the permanent magnets in the respective layers is permanent magnets physically divided in the longitudinal direction of each magnet slot.

Figure 14:
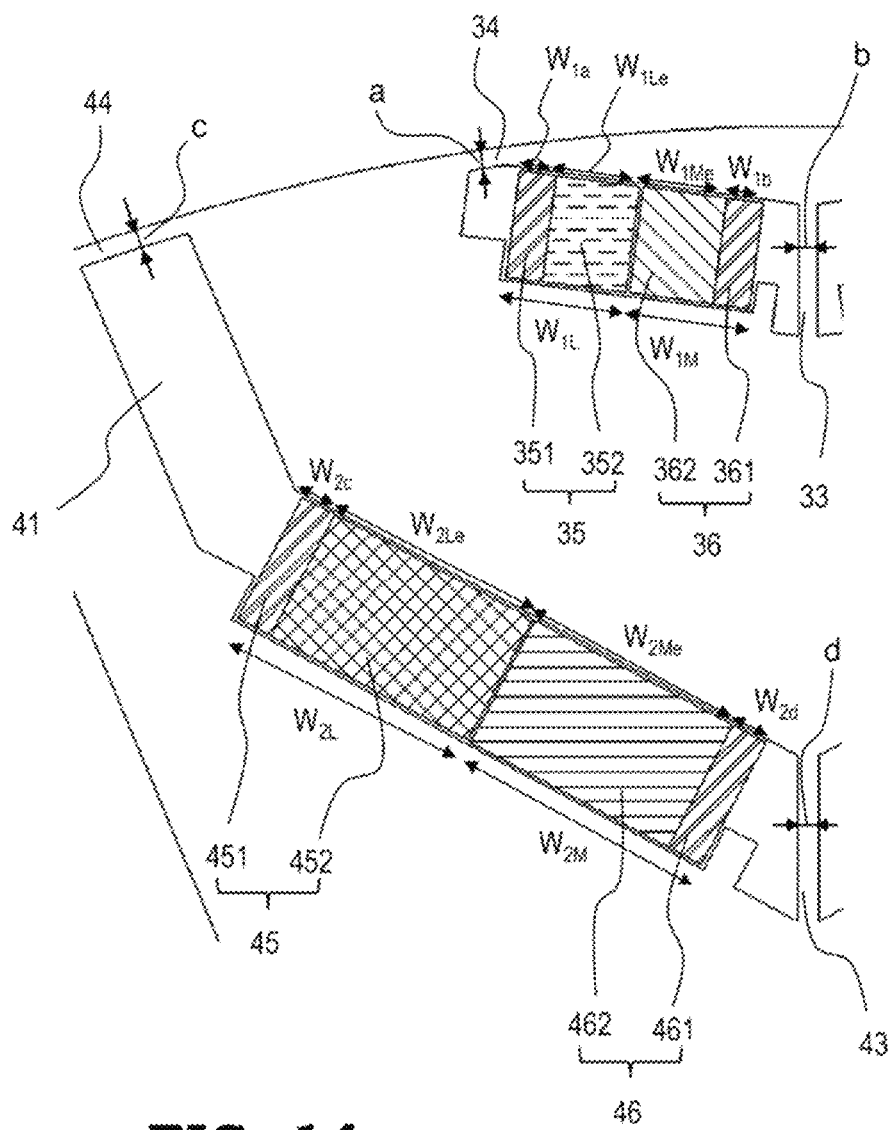
FIG. 14 is an enlarged schematic view showing the details of the dimensions of permanent magnets and bridges in the rotor of the rotary electric machine according to the second embodiment.

FIG. 14 is a sectional view showing the details of the dimensions of the permanent magnets and the bridges of the rotor of the rotary electric machine according to the second embodiment. The width of the first-layer radially-outer bridge 34 on the radially outer side of the rotor is denoted by a, and the width of the first-layer center bridge 33 is denoted by b. The width of the second-layer radially-outer bridge 44 on the radially inner side of the rotor is denoted by c, and the width of the second-layer center bridge 43 is denoted by d. Regarding the width of each bridge, if the width is not uniform, the width at a part where the bridge width is narrowest is defined as the width of the bridge. The width of the divided first-layer outer magnet 35 on the radially outer side of the rotor is denoted by $W_{1L}$, and the width of the divided first-layer center-side magnet 36 is denoted by $W_{1M}$. The width of the divided second-layer outer magnet 45 on the radially inner side of the rotor is denoted by $W_{2L}$, and the width of the divided second-layer center-side magnet 46 is denoted by $W_{2M}$. The width of a first-layer radially-outer-bridge-side magnet 351 used for magnetically saturating the first-layer radially-outer bridge 34 is denoted by $W_{1a}$, and the width of a first-layer center-bridge-side magnet 361 used for magnetically saturating the first-layer center bridge 33 is denoted by $W_{1b}$. The width of a second-layer radially-outer-bridge-side magnet 451 used for magnetically saturating the second-layer radially-outer bridge 44 is denoted by $W_{2c}$, and the width of a second-layer center-bridge-side magnet 461 used for magnetically saturating the second-layer center bridge 43 is denoted by $W_{2d}$. Where the saturation magnetic flux density of the rotor core is denoted by $B_s$, the first-layer magnet magnetic flux density is denoted by $B_{m1}$, and the second-layer magnet magnetic flux density is denoted by $B_{m2}$, the width $W_{1a}$ of the first-layer radially-outer-bridge-side magnet 351, the width $W_{1b}$ of the first-layer center-bridge-side magnet 361, the width $W_{2c}$ of the second-layer radially-outer-bridge-side magnet 451, and the width $W_{2d}$ of the second-layer center-bridge-side magnet 461 are calculated by Expressions (1) to (4), as in the first embodiment.

Where the width of a first-layer outer effective magnet 352 is denoted by $W_{1Le}$, the width of a first-layer inner effective magnet 362 is denoted by $W_{1Me}$, the width of a second-layer outer effective magnet 452 is denoted by $W_{2Le}$, and the width of a second-layer inner effective magnet 462 is denoted by $W_{2Me}$, the width of the first-layer effective magnet is the sum of the width $W_{1Le}$ of the first-layer outer effective magnet 352 and the width $W_{1Me}$ of the first-layer inner effective magnet 362, and the width of the second-layer effective magnet is the sum of the width $W_{2Le}$ of the second-layer outer effective magnet 452 and the width $W_{2Me}$ of the second-layer inner effective magnet 462. The width of the first-layer outer effective magnet 352 is a value obtained by subtracting the width $W_{1a}$ of the first-layer radially-outer-bridge-side magnet 351 from the width $W_{1L}$ of the first-layer outer magnet 35, and the width $W_{1Me}$ of the first-layer inner effective magnet 362 is a value obtained by subtracting the width $W_{1b}$ of the first-layer center-bridge-side magnet 361 from the width $W_{1M}$ of the first-layer inner magnet 36. The width $W_{2Le}$ of the second-layer outer effective magnet 452 is a value obtained by subtracting the width $W_{2c}$ of the second-layer radially-outer-bridge-side magnet 451 from the width $W_{2L}$ of the second-layer outer magnet 45, and the width $W_{2Me}$ of the second-layer inner effective magnet 462 is a value obtained by subtracting the width $W_{2d}$ of the second-layer center-bridge-side magnet 461 from the width $W_{2M}$ of the second-layer inner magnet 46. The width $W_{1Le}$ of the first-layer outer effective magnet 352, the width $W_{1Me}$ of the first-layer inner effective magnet 362, the width $W_{2Le}$ of the second-layer outer effective magnet 452, and the width $W_{2Me}$ of the second-layer inner effective magnet 462 are calculated by Expressions (16) to (19).

$$W_{1Le} = W_{1L} - W_{1a} = W_{1L} - a \times \frac{B_s}{B_{m1}} \quad (16)$$

$$W_{1Me} = W_{1M} - W_{1b} = W_{1M} - \frac{b}{2} \times \frac{B_s}{B_{m1}} \quad (17)$$

$$W_{2Le} = W_{2L} - W_{2c} = W_{2L} - c \times \frac{B_s}{B_{m2}} \quad (18)$$

$$W_{2Me} = W_{2M} - W_{2d} = W_{2M} - \frac{d}{2} \times \frac{B_s}{B_{m2}} \quad (19)$$

At this time, the sum of the width $W_{1Le}$ of the first-layer outer effective magnet 352 and the width $W_{1Me}$ of the first-layer inner effective magnet 362 is the first-layer effective magnet width, and the sum of the width $W_{2Le}$ of the second-layer outer effective magnet 452 and the width $W_{2Me}$ of the second-layer inner effective magnet 462 is the second-layer effective magnet width. Therefore, a first-layer effective magnetic flux $\varphi_{m1}$ is represented as $(W_{1Le}+W_{1Me}) \times B_{m1}$, and a second-layer effective magnetic flux $\varphi_{m2}$ is represented as $(W_{2Le}+W_{2Me}) \times B_{m2}$. Then, if the structure is designed such that the first-layer effective magnetic flux $\varphi_{m1}$ is not greater than half the second-layer effective magnetic flux $\varphi_{m2}$, harmonic components of the rotor magnetomotive force can be reduced. Further, division of the magnets enables reduction in eddy current occurring in the magnets, whereby increase in the magnet temperature is suppressed and demagnetization can be prevented. Eddy current occurring in the magnets causes harmonic magnetic fluxes, resulting in harmonic components of the gap magnetic flux density. Therefore, division of the magnets also contributes to reduction in vibration and noise.

Figure 15:
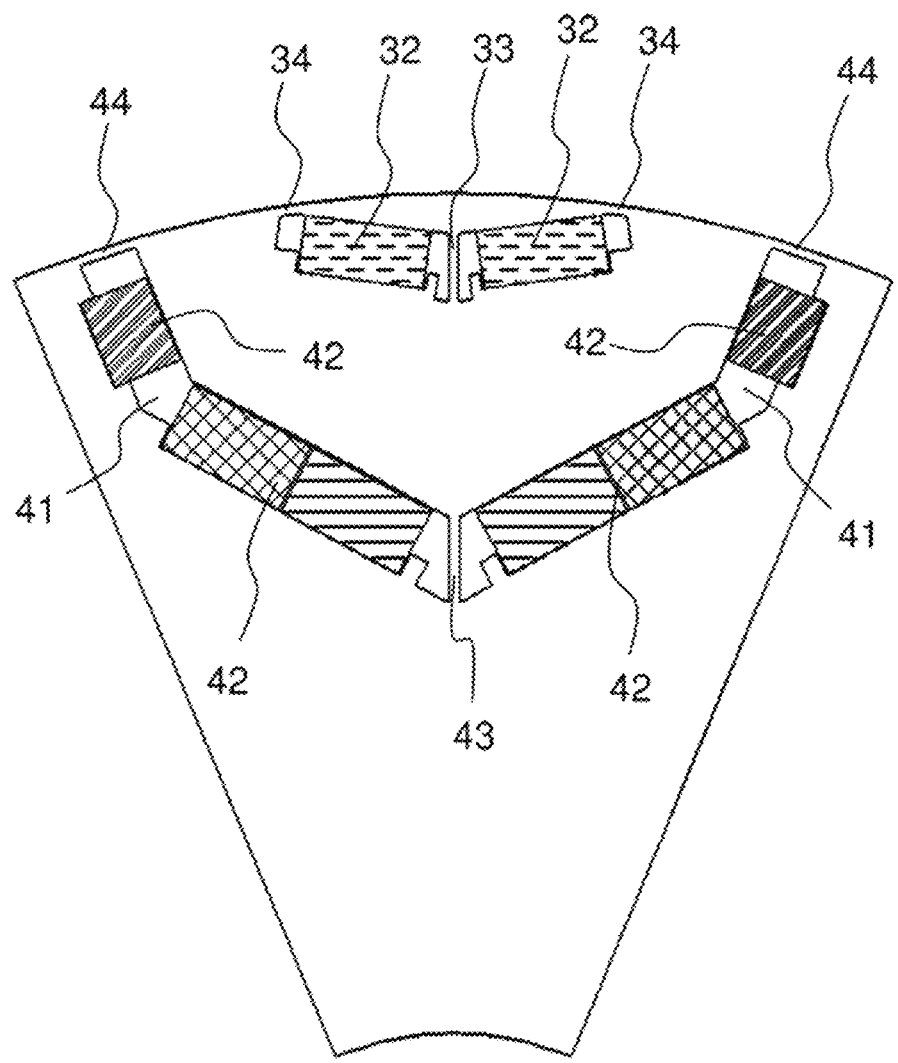
FIG. 15 is an enlarged sectional view showing another structure of the rotor for one pole of the rotary electric machine according to the second embodiment.

FIG. 15 is a sectional view showing another structure of the rotor for one pole of the rotary electric machine according to the second embodiment. The permanent magnet 42 inserted in the second-layer magnet slot may be magnets divided apart from each other with a gap therebetween. Also in the rotary electric machine configured as shown in FIG. 15, if the structure is designed such that the first-layer effective magnetic flux is not greater than half the second-layer effective magnetic flux, harmonic components of the rotor magnetomotive force can be reduced and vibration and noise can be reduced.

Third Embodiment

Figure 16:
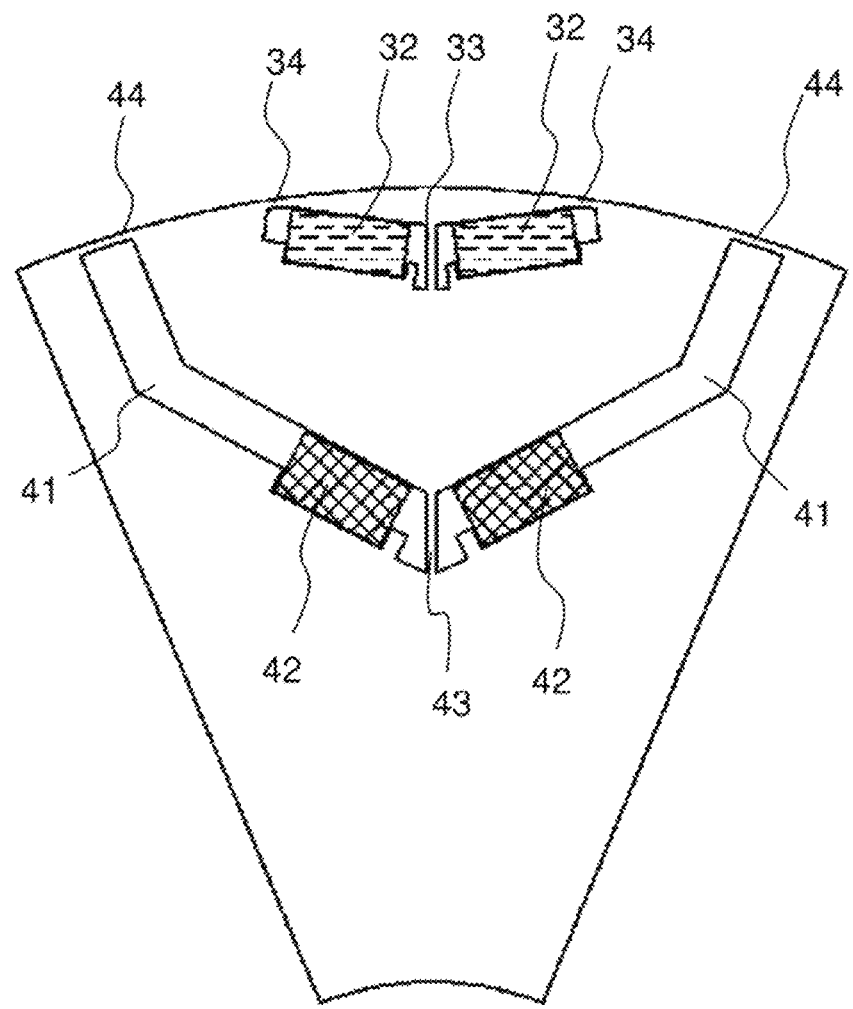
FIG. 16 is an enlarged sectional view showing the structure of a rotor for one pole of a rotary electric machine according to the third embodiment of the present disclosure.

FIG. 16 is a sectional view showing a rotor for one pole of a rotary electric machine according to the third embodiment of the present disclosure. As in the first embodiment, the rotor is composed of a rotor core having two layers of magnet slots arranged in a V shape, and permanent magnets inserted in the magnet slots in two layers. The magnet slots in two layers are composed of the first-layer magnet slots 31 on the radially outer side of the rotor and the second-layer magnet slots 41 on the radially inner side of the rotor. The first-layer magnet slots 31 are retained by the first-layer center bridge 33 located at the center and the first-layer radially-outer bridges 34 located on the radially outer side of the rotor. The second-layer magnet slots 41 are retained by the second-layer center bridge 43 located at the center and the second-layer radially-outer bridges 44 located on the radially outer side of the rotor. The first-layer permanent magnet 32 inserted in the first-layer magnet slot 31 and the second-layer permanent magnet 42 inserted in the second-layer magnet slot 41 are different types. FIG. 16 shows a case where the second-layer magnet magnetic flux density $B_{m2}$ is greater than the first-layer magnet magnetic flux density $B_{m1}$.

Also in this case, if the structure is designed such that the first-layer effective magnetic flux based on the first-layer effective magnet width is not greater than half the second-layer effective magnetic flux based on the second-layer effective magnet width, the effect of minimizing THD of the rotor magnetomotive force is obtained in the same manner. In a case where the second-layer magnet magnetic flux density is greater than the first-layer magnet magnetic flux density, the widths of the second-layer radially-outer-bridge-side magnet and the second-layer center-bridge-side magnet used for magnetically saturating the second-layer radially-outer bridge 44 and the second-layer center bridge 43 become small. Here, the width of the first-layer magnet 32 on the radially outer side of the rotor is denoted by $W_1$, the width of the second-layer magnet 42 on the radially inner side of the rotor is denoted by $W_2$, the saturation magnetic flux density of the rotor core is denoted by $B_s$, the width of the first-layer radially-outer bridge 34 on the radially outer side of the rotor is denoted by a, the width of the first-layer center bridge 33 is denoted by b, the width of the second-layer radially-outer bridge 44 on the radially inner side of the rotor is denoted by c, and the width of the second-layer center bridge 43 is denoted by d. Then, if the structure is designed so as to satisfy the relationship of the above Expression (15), the first-layer effective magnetic flux based on the first-layer effective magnet width is not greater than half the second-layer effective magnetic flux based on the second-layer effective magnet width.

By using magnets such that the second-layer magnet magnetic flux density is greater than the first-layer magnet magnetic flux density, the second-layer magnet width can be reduced, and thus it becomes possible to minimize THD of the rotor magnetomotive force with a smaller amount of magnets, whereby vibration and noise can be reduced.

Although various exemplary embodiments and examples are described in the present application, various features, aspects, and functions described in one or more embodiments are not inherent in a particular embodiment, and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

What is claimed is:

1. A rotary electric machine comprising:
a stator formed in a cylindrical shape, the stator having a plurality of teeth on an inner surface side thereof and having a coil wound through coil slots formed between the teeth adjacent to each other; and a rotor formed in a columnar shape, an outer surface thereof being opposed to an inner surface of the stator with a gap therebetween, the rotor being rotatably provided around a rotation center axis, wherein the rotor has magnet slots arranged in a V shape so as to open from the rotation center axis side toward an outer circumferential side such that the magnet slots are formed in a two-layer structure in a radial direction, the magnet slots in each layer are composed of a pair of slots formed between a center bridge located at a center and respective ones of two radially-outer bridges located between the outer surface of the rotor and the respective slots, and a permanent magnet is inserted in each of the slots, and where in a first-layer permanent magnet which is the permanent magnet inserted in each of first-layer magnet slots which are the magnet slots on a radially outer side, a magnet width excluding a magnet width for magnetically saturating a first-layer center bridge which is the center bridge corresponding to the first-layer magnet slot and a magnet width for magnetically saturating a first-layer radially-outer bridge which is the radially-outer bridge corresponding to the first-layer magnet slot is defined as a first-layer effective magnet width, and a magnetic flux generated from the first-layer effective magnet width is defined as a first-layer effective magnetic flux, and in a second-layer permanent magnet which is the permanent magnet inserted in each of second-layer magnet slots which are the magnet slots on a radially inner side, a magnet width excluding a magnet width for magnetically saturating a second-layer center bridge which is the center bridge corresponding to the second-layer magnet slot and a magnet width for magnetically saturating a second-layer radially-outer bridge which is the radially-outer bridge corresponding to the second-layer magnet slot is defined as a second-layer effective magnet width, and a magnetic flux generated from the second-layer effective magnet width is defined as a second-layer effective magnetic flux, the first-layer effective magnetic flux is not greater than half the second-layer effective magnetic flux.

2. The rotary electric machine according to claim 1, wherein the following expression is satisfied:

$$W_1 - a \times \frac{B_s}{B_{m1}} - \frac{b}{2} \times \frac{B_s}{B_{m1}} \leq \frac{\left(W_2 - c \times \frac{B_s}{B_{m2}} - \frac{d}{2} \times \frac{B_s}{B_{m2}}\right) \times \frac{B_{m2}}{B_{m1}}}{2},$$

where $W_1$ is a magnet width of the first-layer permanent magnet inserted in one of the pair of slots composing the first-layer magnet slots, a is a width of the first-layer radially-outer bridge, b is a width of the first-layer center bridge, $W_2$ is a magnet width of the second-layer permanent magnet inserted in one of the pair of slots composing the second-layer magnet slots, c is a width of the second-layer radially-outer bridge, d is a width of the second-layer center bridge, $B_s$ is a saturation magnetic flux density of a rotor core forming the rotor, $B_{m1}$ is a magnetic flux density of the first-layer permanent magnet, and $B_{m2}$ is a magnetic flux density of the second-layer permanent magnet.

3. The rotary electric machine according to claim 2, wherein the following expression is satisfied:

$$\frac{W_2}{2} + \frac{c}{2} \times \frac{B_s}{B_{m2}} - \frac{d}{4} \times \frac{B_s}{B_{m2}} < L \times \frac{B_s}{B_{m2}},$$

where L is a shortest distance between the first-layer magnet slot and the second-layer magnet slot.

4. The rotary electric machine according to claim 3, wherein each of the first-layer permanent magnet and the second-layer permanent magnet is permanent magnets physically divided in a longitudinal direction of each magnet slot.

5. The rotary electric machine according to claim 3, wherein a magnetic flux density of the second-layer permanent magnet is greater than a magnetic flux density of the first-layer permanent magnet.

6. The rotary electric machine according to claim 2, wherein the following expression is satisfied:

$$0.45 \leq \frac{\theta_{m1}}{\theta_{m2}} \leq 0.62 \ (120 \text{ deg} \leq \theta_{m2} \leq 140 \text{ deg}),$$

where $\theta_{m1}$ is a first-layer magnet pole arc angle which is an angle between a pair of lines connecting the rotation center axis and respective V-shape-inner-side corners of sides of the first-layer magnet slots that are in contact with the first-layer radially-outer bridges, and $\theta_{m2}$ is a second-layer magnet pole arc angle which is an angle between a pair of lines connecting the rotation center axis and respective V-shape-inner-side corners of sides of the second-layer magnet slots that are in contact with the second-layer radially-outer bridges.

7. The rotary electric machine according to claim 6, wherein each of the first-layer permanent magnet and the second-layer permanent magnet is permanent magnets physically divided in a longitudinal direction of each magnet slot.

8. The rotary electric machine according to claim 4, wherein a magnetic flux density of the second-layer permanent magnet is greater than a magnetic flux density of the first-layer permanent magnet.

9. The rotary electric machine according to claim 2, wherein arc angles of the teeth of the stator are set such that, when one of the teeth of the stator is located on an extension line of a line connecting the rotation center axis and a V-shape-inner-side corner of a side of the first-layer magnet slot that is in contact with the first-layer radially-outer bridge, another one of the teeth of the stator is located on an extension line of a line connecting the rotation center axis and a V-shape-inner-side corner of a side of the second-layer magnet slot that is in contact with the second-layer radially-outer bridge.

10. The rotary electric machine according to claim 9, wherein a number of slots per pole per phase of the stator is 2, and the stator has, at ends of the respective teeth, protruding brims so that widths of the teeth are expanded, and the following expressions are satisfied:

$$\theta_{s1} \leq \theta_{m1} \leq \theta_{s2} \text{ and } \theta_{s3} \leq \theta_{m2} \leq \theta_{s4},$$

where $\theta_{m1}$ is a first-layer magnet pole arc angle which is an angle between a pair of lines connecting the rotation center axis and respective V-shape-inner-side corners of sides of the first-layer magnet slots that are in contact with the first-layer radially-outer bridges, in the rotor, and $\theta_{m2}$ is a second-layer magnet pole arc angle which is an angle between a pair of lines connecting the rotation center axis and respective V-shape-inner-side corners of sides of the second-layer magnet slots that are in contact with the second-layer radially-outer bridges, in the rotor, $\theta_{s1}$ is an angle between lines connecting the rotation center axis and respective protrusion ends, of the brims of two teeth across one tooth, that are on the one tooth side, and $\theta_{s2}$ is an angle between lines connecting the rotation center axis and respective protrusion ends of the brims that are on sides far from the one tooth, and $\theta_{s3}$ is an angle between lines connecting the rotation center axis and respective protrusion ends, of the brims of two teeth across three teeth centered at the one tooth, that are on the one tooth side, and $\theta_{s4}$ is an angle between lines connecting the rotation center axis and respective protrusion ends of the brims that are on sides far from the one tooth.

11. The rotary electric machine according to claim 10, wherein each of the first-layer permanent magnet and the second-layer permanent magnet is permanent magnets physically divided in a longitudinal direction of each magnet slot.

12. The rotary electric machine according to claim 10, wherein a magnetic flux density of the second-layer permanent magnet is greater than a magnetic flux density of the first-layer permanent magnet.

13. The rotary electric machine according to claim 9, wherein each of the first-layer permanent magnet and the second-layer permanent magnet is permanent magnets physically divided in a longitudinal direction of each magnet slot.

14. The rotary electric machine according to claim 9, wherein a magnetic flux density of the second-layer permanent magnet is greater than a magnetic flux density of the first-layer permanent magnet.

15. The rotary electric machine according to claim 2, wherein each of the first-layer permanent magnet and the second-layer permanent magnet is permanent magnets physically divided in a longitudinal direction of each magnet slot.

16. The rotary electric machine according to claim 2, wherein a magnetic flux density of the second-layer permanent magnet is greater than a magnetic flux density of the first-layer permanent magnet.

17. The rotary electric machine according to claim 1, wherein each of the first-layer permanent magnet and the second-layer permanent magnet is permanent magnets physically divided in a longitudinal direction of each magnet slot.

18. The rotary electric machine according to claim 17, wherein a magnetic flux density of the second-layer permanent magnet is greater than a magnetic flux density of the first-layer permanent magnet.

19. The rotary electric machine according to claim 1, wherein a magnetic flux density of the second-layer permanent magnet is greater than a magnetic flux density of the first-layer permanent magnet.

* * * * *